United States Patent
Lee et al.

(10) Patent No.: US 10,212,711 B2
(45) Date of Patent: Feb. 19, 2019

(54) METHOD FOR CONTROLLING D2D SIGNAL TRANSMISSION POWER IN WIRELESS COMMUNICATION SYSTEM AND DEVICE FOR SAME

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 15/502,586

(22) PCT Filed: Aug. 28, 2015

(86) PCT No.: PCT/KR2015/009074
§ 371 (c)(1),
(2) Date: Feb. 8, 2017

(87) PCT Pub. No.: WO2016/032285
PCT Pub. Date: Mar. 3, 2016

(65) Prior Publication Data
US 2017/0245282 A1    Aug. 24, 2017

Related U.S. Application Data

(60) Provisional application No. 62/043,391, filed on Aug. 28, 2014.

(51) Int. Cl.
*H04W 72/04* (2009.01)
*H04W 52/24* (2009.01)
(Continued)

(52) U.S. Cl.
CPC ....... *H04W 72/0473* (2013.01); *H04W 52/24* (2013.01); *H04W 52/34* (2013.01);
(Continued)

(58) Field of Classification Search
None
See application file for complete search history.

(56) References Cited

U.S. PATENT DOCUMENTS

| | | | |
|---|---|---|---|
| 2015/0282132 A1* | 10/2015 | Kim | H04W 8/005 370/329 |
| 2016/0014834 A1* | 1/2016 | Chang | H04W 76/14 370/329 |

FOREIGN PATENT DOCUMENTS

| | | |
|---|---|---|
| WO | WO 2013/137580 A1 | 9/2013 |
| WO | WO 2013/181444 A2 | 12/2013 |

OTHER PUBLICATIONS

"LTE D2D Proximity Service," ICT, Jul. 2014, pp. 1-4 (6 pages total), with an English translation.
(Continued)

*Primary Examiner* — Christine T Duong
(74) *Attorney, Agent, or Firm* — Birch, Stewart, Kolasch & Birch, LLP

(57) ABSTRACT

The present invention relates to a method by which a first device-to-device (D2D) terminal transmits a D2D signal in a wireless communication system, and a device therefor. More particularly, the method comprises the steps of: setting a D2D transmission power reference on the basis of a timing reference applied according to a D2D signal type; and transmitting a D2D signal to a second D2D terminal on the basis of D2D transmission power determined according to the D2D transmission power reference, wherein the D2D transmission power reference is configured using a power reference of a wide area network (WAN)-based physical uplink control channel (PUCCH) when the timing reference follows a downlink timing, and configured using a power reference of a WAN-based physical uplink shared channel (PUSCH) when the timing reference follows an uplink timing.

7 Claims, 8 Drawing Sheets

(51) Int. Cl.
*H04W 52/34* (2009.01)
*H04W 52/38* (2009.01)
*H04W 88/02* (2009.01)
*H04W 88/08* (2009.01)

(52) U.S. Cl.
CPC ..... *H04W 52/383* (2013.01); *H04W 72/0413* (2013.01); *H04W 88/02* (2013.01); *H04W 88/08* (2013.01)

(56) References Cited

OTHER PUBLICATIONS

"LTE; Evolved Universal Terrestrial Radio Access (E-UTRA); Physical Layer Procedures (3GPP TS 36.213 Version 11.7.0 Release 11)," ETSI TS 136 213, V11.7.0, Jul. 2014, pp. 1-183.
Samsung, "D2D PUSCH Impact on WAN PUCCH," 3GPP TSG RAN WG1 Meeting #77, R1-142117, Seoul, Korea, May 19-23, 2014, 5 pages.
Alcatel-Lucent Shanghai Bell et al., "Evaluation of Impact of D2D to WAN System Performance," 3GPP TSG RAN WG1 Meeting #77, R1-142059, Seoul, Korea, May 19-23, 2014, 8 pages.
Ericsson, "On Power Control for D2D Communicaiton," 3GPP TSG-RAN WG1 Meeting #78, R1-143374, Dresden, Germany, Aug. 18-22, 2014, 4 pages.
LG Electronics, "Correction to the Power Control of PUSCH and PUCCH," 3GPP TSG RAN WG1 Meeting #68, R1-120416, Dresden, Germany, Feb. 6-10, 2012, 12 pages.
Panasonic, "Power Control for In-Coverage Mode 1/2 in D2D," 3GPP TSG RAN WG1 Meeting #78, R1-143002, Dresden, Germany, Aug. 18-22, 2014, pp. 1-5 (6 pages total).
Samsung, "Discussion on CP Length for D2D Discovery and Data Channels," 3GPP TSG RAN WG1 Meeting #78, R1-143078, Dresden, Germany, Aug. 18-22, 2014, 5 pages.
Sharp, "Remaining Issues on Power Control for D2D Communication," 3GPP TSG RAN WG1 Meeting #78, R1-143128, Dresden, Germany, Aug. 18-22, 2014, pp. 1-6 (7 pages total).

\* cited by examiner

FIG. 2
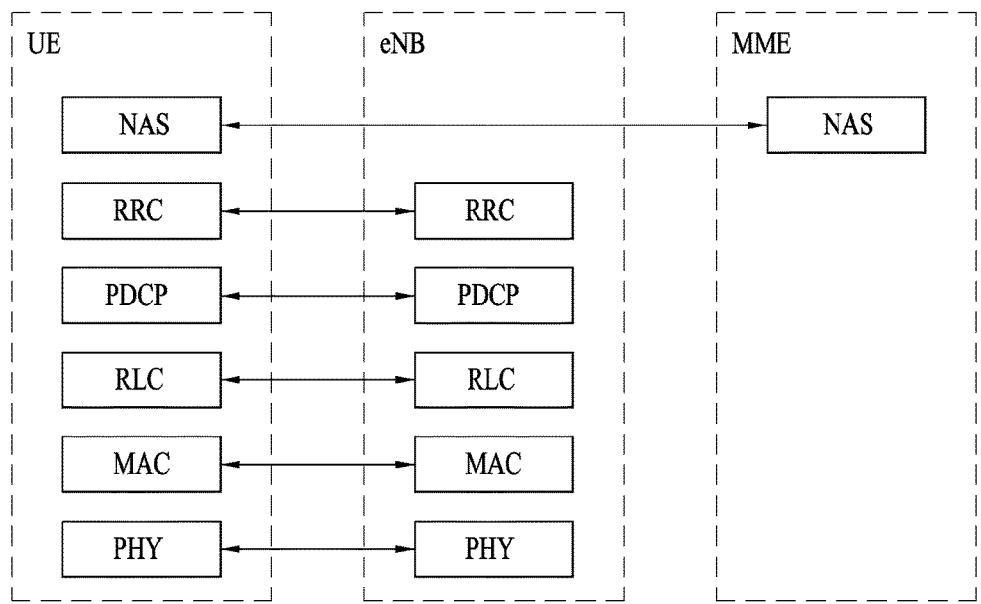
(a) control-plane protocol stack
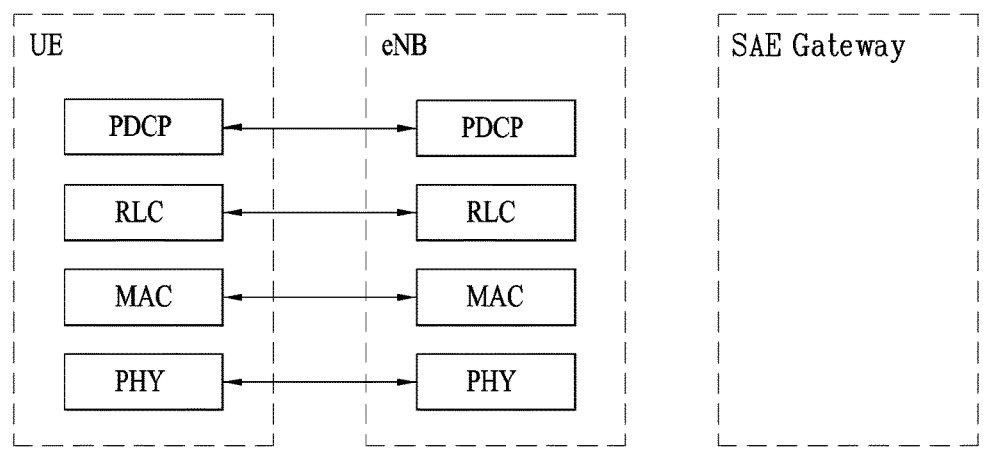
(b) user-plane protocol stack

FIG. 8
(a)
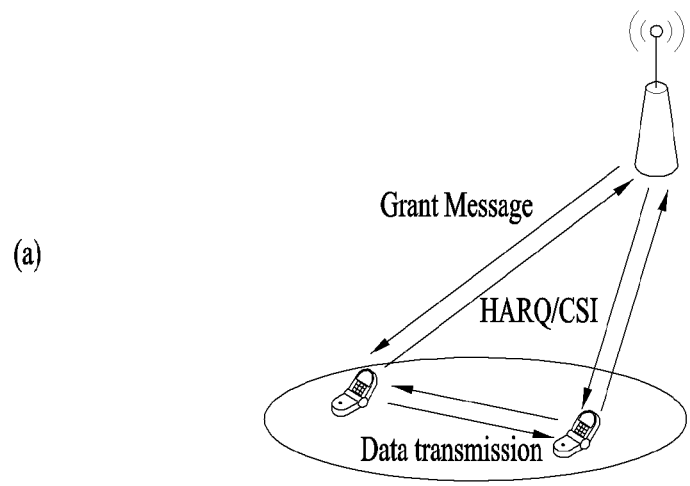
(b)
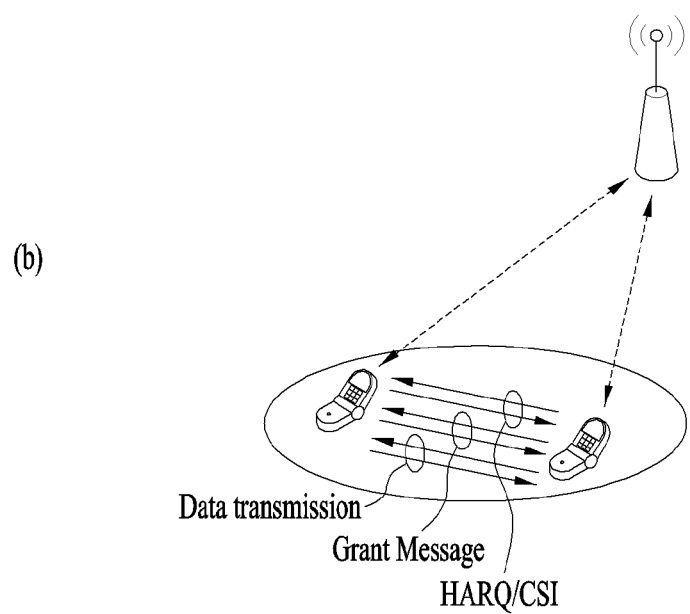

METHOD FOR CONTROLLING D2D SIGNAL TRANSMISSION POWER IN WIRELESS COMMUNICATION SYSTEM AND DEVICE FOR SAME

CROSS REFERENCE TO RELATED APPLICATIONS

This application is the National Phase of PCT International Application No. PCT/KR2015/009074, filed on Aug. 28, 2015, which claims priority under 35 U.S.C. 119(e) to U.S. Provisional Application No. 62/043,391, filed on Aug. 28, 2014, all of which are hereby expressly incorporated by reference into the present application.

TECHNICAL FIELD

The present invention relates to a wireless communication system and, more specifically, to a method for controlling a device-to-device (D2D) signal transmission power in a wireless communication system, and a device for the same.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method for controlling a device-to-device (D2D) signal transmission power in a wireless communication system, and a device for the same.

The technical problems solved by the present invention are not limited to the above technical problems and those skilled in the art may understand other technical problems from the following description.

Technical Solution

In an aspect of the present invention, a method of transmitting a D2D signal by a first device-to-device (D2D) UE in a wireless communication system includes: setting a D2D transmission power reference on the basis of a timing reference applied depending on D2D signal type; and transmitting a D2D signal to a second D2D UE on the basis of D2D transmission power determined according to the D2D transmission power reference, wherein the D2D transmission power reference is set using a wide area network (WAN) based physical uplink control channel (PUCCH) power reference when the timing reference conforms to downlink timing and is set using a WAN based physical uplink shared channel (PUSCH) power reference when the timing reference conforms to uplink timing.

The timing reference may be set to conform to downlink timing when the D2D signal type is D2D scheduling assignment or type-1 D2D discovery and may be set to conform to uplink timing when the D2D signal type is mode-1 D2D communication.

The D2D transmission power may be set to be higher for a D2D UE in a RRC connected state than for a D2D UE in an RRC idle state.

The D2D transmission power may be re-set for a D2D UE in an RRC connected state according to WAN based uplink communication related power control command (TPC) parameter variation.

In another aspect of the present invention, a method of transmitting a D2D signal and a WAN signal by a first D2D UE in a wireless communication system supporting carrier aggregation includes: setting a D2D transmission power reference on the basis of a first timing reference for the D2D signal and a second timing reference for the WAN signal; and transmitting a D2D signal to a second D2D UE on the basis of D2D transmission power determined according to the D2D transmission power reference, wherein the D2D transmission power reference is set using a WAN based PUCCH power reference when a first subframe depending on the first timing reference and a second subframe depending on the second timing reference overlap and the second timing reference conforms to downlink timing, and wherein the D2D transmission power reference is set using a WAN based PUSCH power reference when the first subframe depending on the first timing reference and the second subframe depending on the second timing reference overlap and the second timing reference conforms to uplink timing.

In another aspect of the present invention, a first D2D UE transmitting a D2D signal in a wireless communication system includes: a radio frequency unit; and a processor, wherein the processor is configured to set a D2D transmission power reference on the basis of a timing reference applied depending on D2D signal type and to transmit a D2D signal to a second D2D UE on the basis of D2D transmission power determined according to the D2D transmission power reference, wherein the D2D transmission power reference is set using a wide area network (WAN) based physical uplink control channel (PUCCH) power reference when the timing reference conforms to downlink timing and is set using a WAN based physical uplink shared channel (PUSCH) power reference when the timing reference conforms to uplink timing.

It is to be understood that both the foregoing general description and the following detailed description are merely exemplary of the invention, and are intended to provide an overview or framework for understanding the nature and character of the invention as it is claimed.

Advantageous Effects

According to embodiments of the present invention, a UE can efficiently control D2D signal transmission power in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 is a diagram showing a control plane and a user plane of a radio interface protocol between a UE and an E-UTRAN based on a 3rd generation partnership project (3GPP) radio access network standard;

FIG. 8 is a reference diagram illustrating D2D communication (UE-to-UE communication);

BEST MODE

Figure 1:
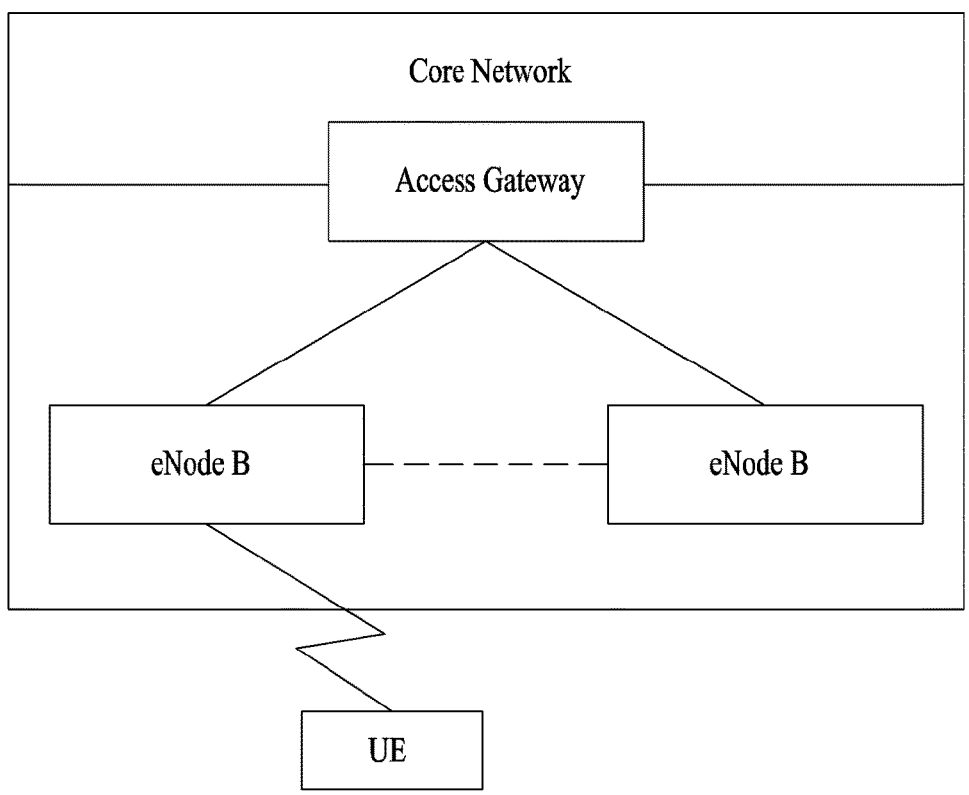
FIG. 1 is a diagram showing a network structure of an Evolved Universal Mobile Telecommunications System (E-UMTS) as an example of a wireless communication system.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
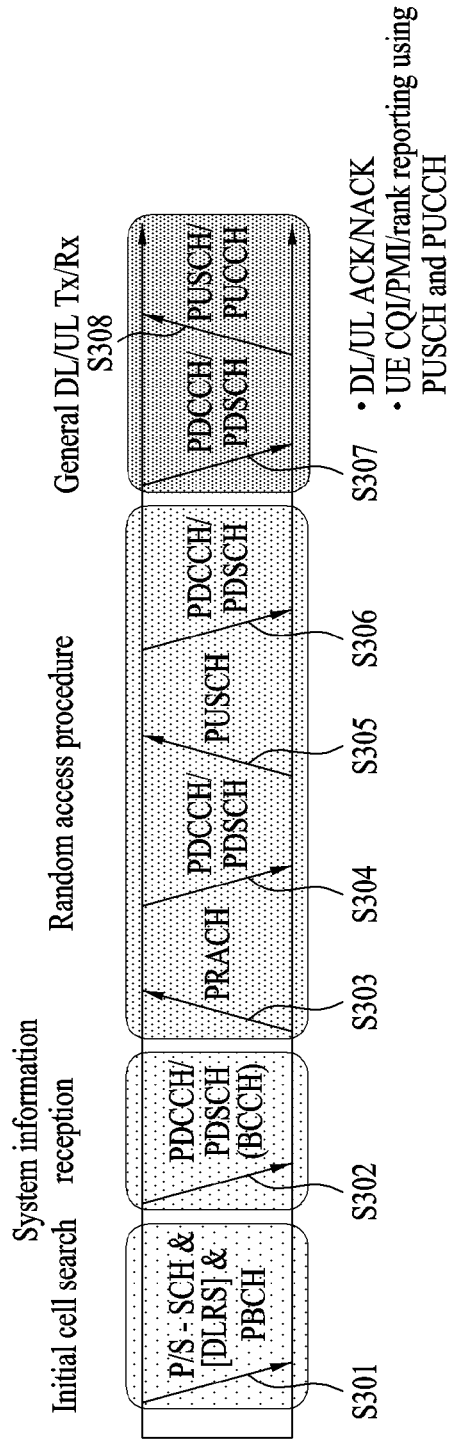
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
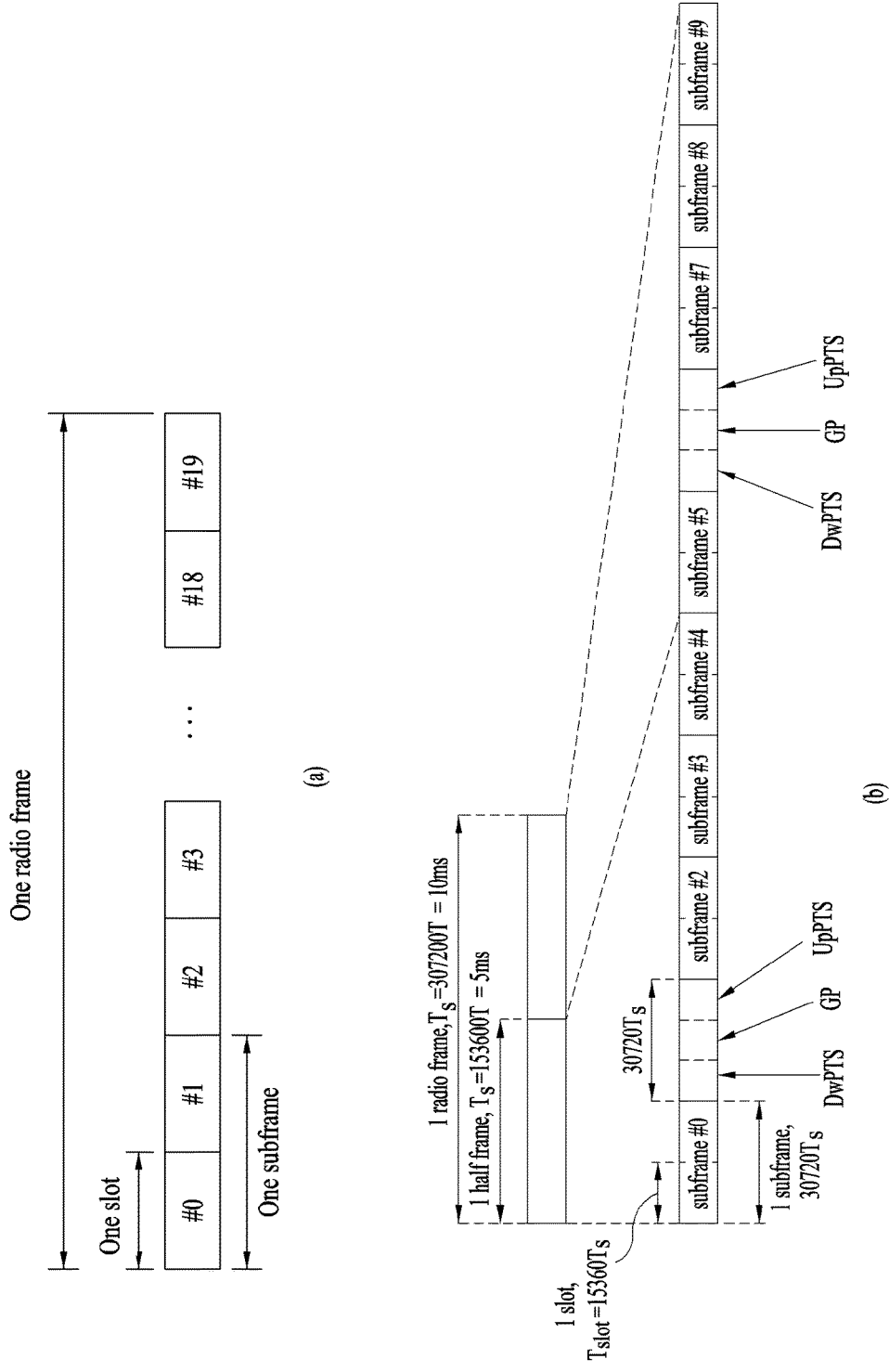
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes, a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE, whereas the UpPTS is used for channel estimation in an eNB and uplink transmission synchronization in a UE. That is, the DwPTS is used for a downlink transmission, the UpPTS is used for a uplink transmission, and, specifically, the UpPTS is used for a transmission of the PRACH preamble or a SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

In Table 2, D indicates a downlink subframe, U indicates an uplink subframe, and S represents the special subframe. Additionally, in Table 2, downlink-uplink switching periodicity in the uplink/downlink subframe configuration of each system.

The above-described structure of the radio frame is merely exemplary. And, therefore, the number of subframes included in the radio frame or the number of slots included in a subframe, and the number of symbols included in one slot may be diversely varied.

Figure 5:
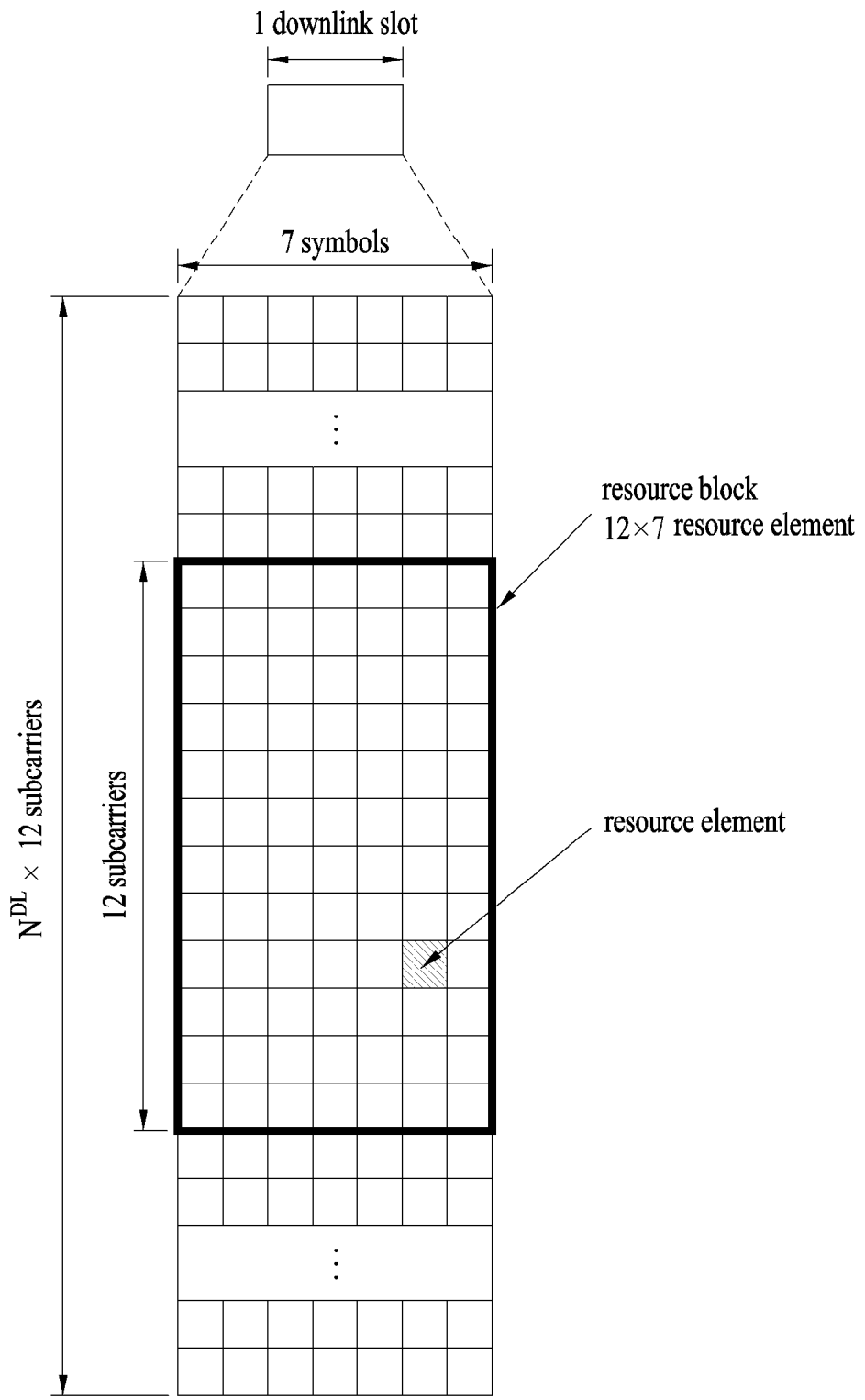
FIG. 5 illustrates a resource grid for a downlink slot.

FIG. 5 illustrates a resource grid for a downlink slot.

Referring to FIG. 5, a downlink slot includes $N_{symb}^{DL}$ OFDM symbols in a time domain and $N_{RB}^{DL}$ resource blocks in a frequency domain. Since each resource block includes $N_{sc}^{RB}$ subcarriers, the downlink slot includes $N_{RB}^{DL} \times N_{SC}^{RB}$ subcarriers in the frequency domain. Although FIG. 5 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} \times N_{sc}^{RB}$ resource elements. The number

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

$N_{RB}^{DL}$ of resource blocks included in the downlink slot depends on a downlink transmission bandwidth configured in a cell.

Figure 6:
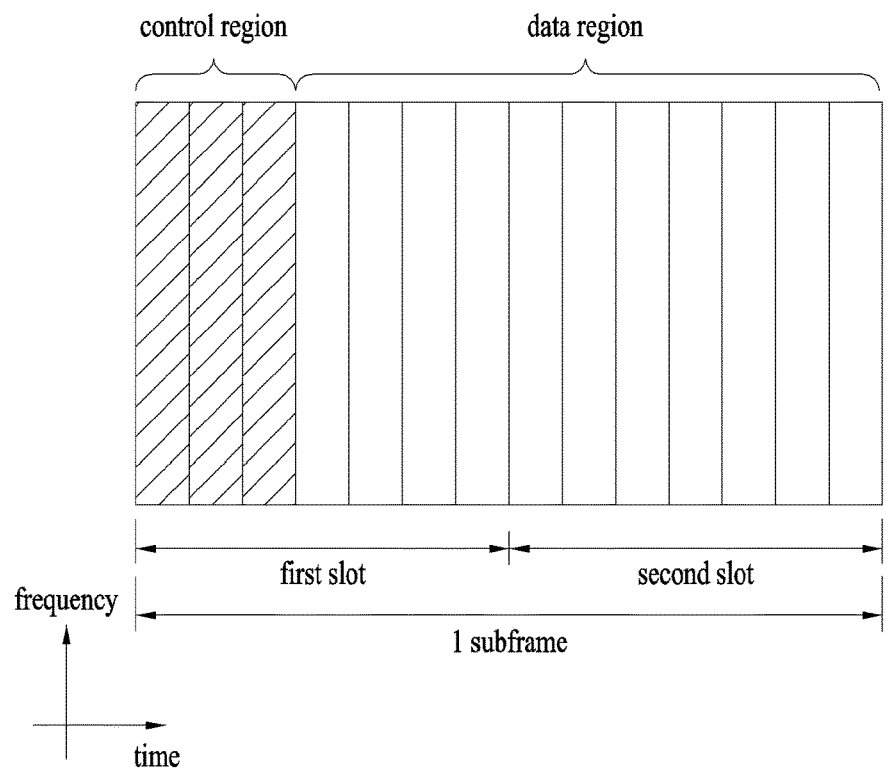
FIG. 6 illustrates an example of a downlink subframe structure.

FIG. 6 illustrates a downlink subframe structure.

Referring to FIG. 6, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
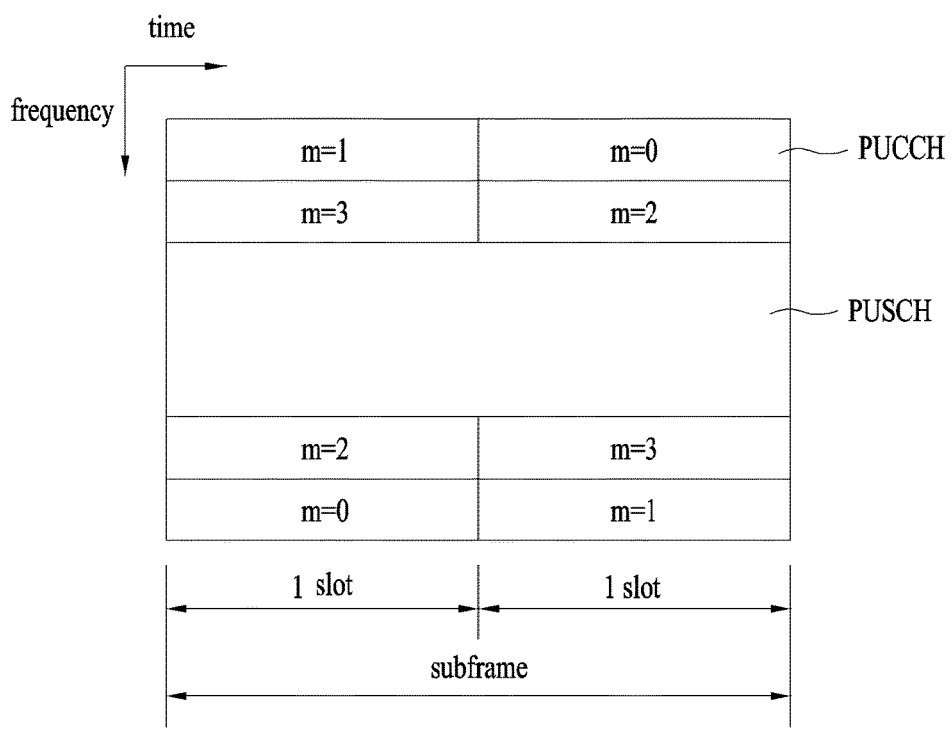
FIG. 7 is a diagram showing a structure of an uplink subframe used in LTE.
Figure 9:
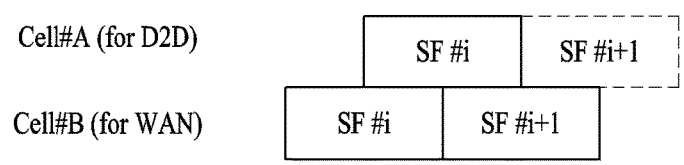
FIG. 9 is a reference diagram illustrating a case in which different cells have different timing references in a wireless communication system supporting carrier aggregation.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

A description will be given of a method for controlling uplink transmission power in an LTE system.

A method through which a UE controls uplink transmission power thereof includes open loop power control (OLPC) and closed loop power control (CLPC). The former controls power by estimating downlink signal attenuation from a BS of a cell to which a UE belongs and compensating for the downlink signal attenuation. That is, OLPC controls uplink power in a manner of increasing uplink transmission power when downlink signal attenuation increases as a distance between a UE and a BS increases. The latter controls uplink power in a manner of directly delivering information (i.e., a control signal) necessary to adjust uplink transmission power in a BS.

The following equation 1 is used to determine transmission power of a UE when a serving cell c transmits only a PUSCH instead of simultaneously transmitting the PUSCH and a PUCCH in a subframe i in a system supporting carrier aggregation.

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}[dBm] \quad \text{[Equation 1]}$$

The following equation 2 is used to determine PUSCH transmission power when the serving cell c simultaneously transmits the PUSCH and the PUCCH in the subframe i in a system supporting carrier aggregation.

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}[dBm] \quad \text{[Equation 2]}$$

Parameters described below in association with Equations 1 and 2 determine uplink transmission power of a UE in the serving cell c. In Equation 1, $P_{CMAX,c}(i)$ denotes maximum transmission power of the UE in the subframe i. In Equation 2, $\hat{P}_{CMAX,c}(i)$ denotes a linear value of $P_{CMAX,c}(i)$ and $\hat{P}_{PUCCH}(i)$ represents a linear value of $P_{PUCCH}(i)$ Here, $P_{PUCCH}(i)$ indicates PUCCH transmission power in the subframe i.

In Equation 1, $M_{PUSCH,c}(i)$ is a parameter indicating a PUSCH resource allocation bandwidth represented by the number of resource blocks valid for the subframe i and is allocated by a BS. $P_{O\_PUSCH,c}(j)$ is a parameter corresponding to the sum of a cell-specific nominal component $P_{O\_NOMINAL\_PUSCH,c}(j)$ and a UE-specific component $P_{O\_UE\_PUSCH,c}(j)$ provided by a higher layer and is signaled from a BS to a UE.

The PUSCH transmissions/retransmissions j is 1 for an uplink grant and the PUSCH transmissions/retransmissions j is 2 for a random access response. In addition, $P_{O\_UE\_PUSCH,c}(2)=0$ $P_{O\_NOMINAL\_PUSCH,c}(2)=P_{O\_PRE}+\Delta_{PREAMBLE\_Msg3}$, and a parameter $P_{O\_PRE}$ and $\Delta_{PREAMBLE\_Msg3}$ are signaled by a higher layer.

$\alpha_c(j)$ is a pathloss compensation factor which is a cell-specific parameter provided by a higher layer and transmitted as 3 bits by a BS. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to a UE by a BS.

Pathloss $PL_c$ is a downlink pathloss (or signal loss) estimate calculated in dB by a UE and is represented as $PL_c$=referenceSignalPower−higher layer filteredRSRP. Here, referenceSignalPower can be signaled to a UE by a BS through a higher layer.

$f_c(i)$ is a value indicating current PUSCH power control adjustment state with respect to the subframe i and can be represented as a current absolute value or accumulated value. If accumulation is enabled on the basis of parameters provided from a higher layer or a TPC command $\delta_{PUSCH,c}$ is included in a PDCCH along with DCI format 0 for the serving cell c having CRC scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through a PDCCH along with DCI format 0/4 or 3/3A in a subframe i-$K_{PUSCH}$. Here, $f_c(0)$ is the first value after reset of the accumulated value.

The value of $K_{PUSCH}$ is defined in LTE standards as follows.

For FDD (Frequency Division Duplex), $K_{PUSCH}$ is 4. In TDD $K_{PUSCH}$ has values shown in Table 3.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

A UE attempts to decode a DCI format for a PDCCH in DCI format 0/4 with C-RNTI thereof or decode a DCI format for a PDCCH and SPS C-RSNTI in DCI format 3/3A with TPC-PUSCH-RNTI in each subframe except a DRX state. When DCI format 0/4 and DCI format 3/3A for the serving cell c are detected in the same subframe, the UE needs to use $\delta_{PUSCH,c}$ provided in DCI format 0/4. $\delta_{PUSCH,c}$ is 0 dB when there is no TPC command decoded for the serving cell c, DRX is generated or the subframe i is a subframe that is not an uplink subframe in TDD.

An accumulated $\delta_{PUSCH,c}$ value signaled on the PDCCH with DCI format 0/4 is shown in the following table 4. When the PDCCH along with DCI format 0 is validated through SPS activation or the PDCCH is released, $\delta_{PUSCH,c}$ is 0 dB. An accumulated $\delta_{PUSCH,c}$ value signaled on the PDCCH along with DCI format 3/3A may conform to Table 4 or Table 5 which is determined by a TPC-index parameter provided by a higher layer.

TABLE 4

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 5

| TPC Command Field in DCI format 3A | Accumulated $\delta_{PUSCH,c}$ [dB] |
|---|---|
| 0 | −1 |
| 1 | 1 |

When transmission power reaches maximum transmission power $\hat{P}_{CMAX}(i)$ in the serving cell c, a positive TPC command is not accumulated for the serving cell c Conversely, when the UE reaches minimum power, a negative TPC command is not accumulated.

The following equation 3 represents uplink power control with respect to a PUCCH in LTE.

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}[\text{dBm}] \quad [\text{Equation 3}]$$

In Equation 3, i is a subframe index and c is a cell index. The value of $\Delta_{TxD}(F')$ is provided by the higher layer to a UE when the UE is set by a higher layer to transmit a PUCCH through two antenna ports and the value is 0 in other cases. Parameters described below are related to a serving cell having a cell index c.

Here, $P_{CMAX,c}(i)$ indicates maximum transmission power of a UE, $P_{0\_PUCCH}$ is a parameter corresponding to the sum of cell-specific parameters and is signaled by a BS through a higher layer, and $PL_c$ is a downlink pathloss (or signal loss) estimate calculated in dB by a UE and is represented as $PL_c$=referenceSignalPower−higher layer filteredRSRP. In addition, h(n) is a value variable according to PUCCH formats, $n_{CQI}$ indicates the number of information bits for channel quality information (CQI), and $n_{HARQ}$ represents the number of HARQ bits. $\Delta_{F\_PUCCH}(F)$ is a relative value with respect to PUCCH format 1a, corresponds to PUCCH format #F and is signaled by a BS through higher layer signaling. g(i) denotes a current PUCCH power control adjustment state of a subframe having index i.

g(0)=0 when $P_{O\_UE\_PUCCH}$ is changed by a higher layer and g(0)=$\Delta P_{rampup}+\delta_{msg2}$ if not. $\delta_{msg2}$ is a TPC command indicated by a random access response and $\Delta P_{rampup}$ corresponds to total power ramp-up from the first to last preambles provided by a higher layer.

When transmission power reaches maximum transmission power $P_{CMAX,c}(i)$ in a primary cell, a positive TPC command is not accumulated for the primary cell. Conversely, when a UE reaches a minimum power, a negative TPC command is not accumulated. The UE resets accumulation when $P_{O\_UE\_PUCCH}$ is changed by a higher layer or a random access response message is received.

Tables 6 and 7 show values of $\delta_{PUCCH}$ indicated by a TPC command in DCI formats. Particularly, Table 6 shows values of $\delta_{PUCCH}$ indicated in DCI formats other than DCI format 3A and Table 7 shows values of $\delta_{PUCCH}$ indicated in DCI format 3A.

TABLE 6

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

A description will be given of D2D communication (UE-to-UE Communication).

D2D communication can be divided into a case in which communication is assisted by a network/coordination station (e.g., BS) and a case in which communication is not assisted.

FIG. 8(a) illustrates a case in which a network/coordination station intervenes in transmission and reception of a control signal (e.g., a grant message), HARQ, channel state information and the like and only data transmission and reception are performed between UEs performing D2D communication. FIG. 8(b) illustrates a case in which a network provides only minimum information (e.g., D2D connection information that can be used in a corresponding cell) and UEs performing D2D communication forms a link and perform data transmission and reception.

A description will be given of a method of efficiently setting/operating D2D signal transmission power (referred to hereinafter D2D SIG TX POWER) of a UE (referred to hereinafter D2D TX UE) that transmits D2D signals when D2D communication is performed according to the present invention. In the present invention, D2D communication refers to communication between UEs using a direct radio channel. Here, while a UE refers to a user terminal, network equipment such as an eNB may be regarded as a UE to which the present invention is applicable when the network equipment transmits and receives signals according to a communication scheme between UEs. In addition, the present invention will be described on the basis of 3GPP LTE. However, the present invention can be extended and applied to systems other than 3GPP LTE.

Prior to description of the present invention, D2D SIG TX POWER setting will be described first.

For mode 1 D2D communication, an uplink reference value can consider the following conditions.

P0 and α for mode 1 D2D communication are set by an eNB.

P0 and α for D2D communication may differ from P0 and α for WAN communication.

eNB-UE pathloss is not used as UE-UE pathloss.

An X-bit TPC command is transmitted through a D2D grant.

Further, whether the same power control parameter is applied to scheduling assignment (SA) and data, whether power control is accumulated power control or absolute power control, and a boosting range different from that of cellular can be considered.

Maximum power transmission is not permitted.

Open-loop power control is disclosed in detail to in-coverage UEs that perform mode 2 communication and type 1/type 2 discovery.

$P_0$ and α are signaled by a higher layer.

$P_0$ and α for D2D communication may differ from P0 and α for WAN communication. Here, "1" exists as one of values of α, and $P_0$ and α for $P_{cmax}$ transmission can be supported by all UEs.

Table 8 shows D2D grant (in consideration of interpolation with respect to other bandwidths).

TABLE 8

| | 1.4 MHz | 20 MHz |
|---|---|---|
| Hopping flag | 1 | 1 |
| Data RB allocation | 5 | 13 |
| T-RPT index | 7 | 7 |
| SA resource index | 6 | 6 |
| TPC | 1 | 1 |
| Total: | 20 | 28 |
| Rel-8 Format at 0 | 21 | 28 |

A scheduling assignment resource index is an index of a scheduling assignment resource pool and indicates both of time and frequency dimensions. Further, index mapping in the resource pool may be predetermined or signaled by a higher layer.

TPC bit is used to switch maximum available power and open-loop power control.

In mode 1 and mode 2, a T-RPT (Time-Resource Pattern Type) field in D2D grant and scheduling assignment (SA) is 7 bits.

Mode 1 grant indicates the next instance of the SA resource pool that starts at least 4 ms after a subframe in which mode 1 grant is transmitted.

D2D transmission power setting does not affect WAN UL communication related power setting.

A description will be given of a method of efficiently setting/operating D2D SIG TX power of a D2D TX according to the present invention on the basis of the aforementioned D2D signal transmission power.

There may be a difference (referred to hereinafter as a TX power setting error) between power actually emitted by the D2D TX UE for D2D signal transmission and power assumed to be emitted by the D2D TX UE. Here, the TX power setting error may be generated due to hardware (e.g., amplifier) properties and/or other parameters (e.g., temperature).

In other words, while it is assumed that the D2D TX UE emits power X [dBm] for D2D signal transmission, actually emitted power may be (X+Δ) [dBm] (e.g., −Y≤Δ≤+Y, Y being a real number equal to or greater than 0). Here, variable Δ indicates the TX power setting error.

In the present invention, a parameter $P_0$ may refer to a parameter $P_{0\_UE\_D2D}$ and/or a parameter $P_{0\_NOMINAL\_D2D}$ independently set or signaled for D2D communication. Here, the parameters $P_{0\_UE\_D2D}$ and/or $P_{0\_NOMINAL\_D2D}$ may be calculated/derived by applying a previously defined or signaled offset value to WAN UL communication related $P_{0\_UE\_PUSCH}$ and/or $P_{0\_NOMINAL\_PUSCH}$. Otherwise, the parameters $P_{0\_UE\_D2D}$ and/or $P_{0\_NOMINAL\_D2D}$ may be delivered to a D2D UE through a predefined signal (e.g., SIB signal or RRC signaling) or predefined as a specific value.

In the present invention, a parameter $P_{MAX\_D2D}$ may refer to maximum D2D power and/or maximum available D2D power permitted or designated from the viewpoint of a UE performing D2D communication (or a serving cell to which D2D communication is set). Here, the parameter $P_{MAX\_D2D}$ may be calculated/derived by applying a previously defined or signaled offset value to a WAN UL communication related parameter $P_{CMAX}$ (or $P_{CMAX,c}$) Otherwise, the parameter $P_{MAX\_D2D}$ may be delivered to a D2D UE through a predefined signal (e.g., SIB signal or RRC signaling) or predefined as a specific value.

First Scheme

According to a first scheme of the present invention, D2D SIG TX power of a D2D TX UE in RRC_IDLE mode may be set to be relatively conservative compared to that in RRC_CONNECTED mode.

According to the present invention, a parameter $P_0'''$ of the D2D TX UE in RRC_IDLE mode can be set to $(P_0'-Y)$ [dBm] in consideration of the aforementioned TX power setting error (e.g., −Y≤Δ≤+Y, Y being a real number equal to or greater than 0). Here, the parameter $P_0'$ indicates a parameter $P_0$ of a D2D TX UE in RRC_CONNECTED mode.

Further, a parameter $P_{MAX\_D2D}''$ of the D2D TX UE in RRC_IDLE MODE can be set to $(P_{MAX\_D2D}'-Y)$ [dBm]. Here, the parameter $P_{MAX\_D2D}'$ denotes a parameter $P_{MAX\_D2D}$ of a D2D TX UE in RRC_CONNECTED mode. $P_{MAX\_D2D}$ denotes maximum transmission power set for D2D communication, may refer to at least one of $P_{CMAX}$, $P_{SSCH}$, $P_{CMAX,PSCCH}$, $P_{CMAX,PSDCH}$, $P_{CMAX,PSBCH}$ and $P_{CMAX,SSSS}$ and may be signaled to a UE through predefined signaling (e.g., higher layer signaling, physical layer signaling or the like).

In addition, an offset parameter (referred to hereinafter as OFFSET_1) for the first scheme may be additionally defined and a corresponding OFFSET_1 parameter (i.e., OFFSET_1=−Y) may be finally applied (or added) to a D2D OLPC calculation value of the D2D TX UE in RRC_IDLE MODE, or $P_{MAX\_D2D}''$ of the D2D TX UE in RRC_IDLE mode may be set to $(P_{MAX\_D2D}'+OFFSET\_1)$.

Such methods may be interpreted as conservatively setting D2D SIG TX power of the D2D TX UE in RRC_IDLE mode in consideration of the relatively large TX power setting error. Accordingly, interference applied to WAN UL communication, generated from D2D signal transmission of the D2D TX UE in RRC_IDLE mode, can be reduced/limited. For example, it is difficult for an eNB to (semi-)dynamically (or efficiently) perform power control for D2D signal transmission for a D2D UE in RRC_IDLE mode. Accordingly, a D2D signal transmission power range of the D2D UE can be set conservatively (or relatively low) to reduce the influence of interference on WAN UL communication.

Further, $P_0''$ of the D2D TX UE in the RRC_IDLE mode may be set to $(P_0'+Y)$ [dBm], $P_{MAX\_D2D}''$ may be set to $(P_{MAX\_D2D}'+Y)$ [dBm] or the aforementioned OFFSET_1 parameter may be set to +Y (i.e., absolute method).

Second Scheme

According to the present invention, D2D SIG TX power of a D2D TX UE in RRC_CONNECTED mode may be (re)adjusted in consideration of WAN UL communication related TPC (Transmission Power Control) parameter variation.

Here, WAN UL communication related TPC parameters may refer to at least part (i.e., all or part) of predefined PUSCH transmission setting related parameters (e.g., $f_c(\bullet)$, $P_{0\_UE\_PUSCH,c}$, $P_{0\_NOMINAL\_PUSCH,c}$, $\alpha_c(\bullet)$, $\Delta_{TF,c}(\bullet)$, $M_{PUSCH,c}(\bullet)$, etc.) or refer to at least part (i.e., all or part) of predefined PUCCH transmission power setting related parameters (e.g., $g(\bullet)$, $P_{0\_UE\_PUCCH}$, $P_{0\_NOMINAL\_PUCCH}$, $h(\bullet)$, $\Delta_{F\_PUCCH}(\bullet)$, $\Delta_{TxD}(\bullet)$, etc.).

As an example of the present scheme, when $f_c(\bullet)$ (or $g(\bullet)$) indicates a positive value, the $P_0'$ parameter of the D2D TX UE in RRC_CONNECTED mode may be set in the form of $(P_0''+Q(\bullet))$ [dBm] or $P_{MAX\_D2D}'$ parameter of the D2D TX UE in RRC_CONNECTED mode may be set in the form of $(P_{MAX\_D2D}''+Q(\bullet))$ [dBm].

That is, a serving cell/eNB can approximately recognize the TX power setting error in the corresponding D2D UE through PUSCH (and/or PUCCH) TPC by employing the second scheme. Accordingly, if the TX power setting error is not large or is lower than a previously defined or signaled threshold value, interference actually applied to WAN UL communication can be permitted (that is, tolerable) even when the D2D SIG TX power is set to be higher than D2D SIG TX power conservatively set (i.e., first scheme) in RRC_IDLE mode by considering a relatively large TX power setting error.

Furthermore, $Q(\bullet)$ refers to a function having the parameter $f_c(\bullet)$ (or $g(\bullet)$) as an input variable and may be defined in example #2-1 or #2-2 below. Here, the example below shows a case in which $Q(\bullet)$ has only $f_c(\bullet)$ as an input variable, which can be used when $f_c(\bullet)$ indicates a positive value.

Example #2-1

$$Q(f_c(\bullet))=a \cdot f_c(\bullet)$$

Here, a is a real number and may be set to a previously signaled or fixed value.

Example #2-2

$$Q(f_c(\bullet))=\mathrm{MAX}(W_1, \mathrm{MIN}(W_2, f_c(\bullet)))$$

Here, MIN(•) refers to a function for deriving a smaller value from among input parameters and MAX(•) refers to a function for driving a larger value from among the input parameters. In addition, $W_1$ may be set to a previously signaled or fixed specific value (e.g., 0 [dB]) such that the D2D TX UE in RRC_CONNECTED mode sets/applies higher transmission power than that in RRC_IDLE mode. $W_2$ denotes a maximum value of a positive power offset that can be additionally applied by the D2D TX UE in RRC_CONNECTED mode (compared to transmission power in RRC_IDLE MODE) and may be set to a previously signaled of fixed specific value (e.g., 3 [dB]).

In addition, OFFSET_1 parameter (i.e., OFFSET_1=+Q(•)) described in the first scheme may be finally applied/added to a D2D OLPC calculation value of the D2D TX UE in RRC_CONNECTED mode, or the $P_{MAX\_D2D}'$ parameter of the D2D TX UE in RRC_CONNECTED mode may be set to ($P_{MAX\_D2D}''$+OFFSET_1).

When $f_c(\bullet)$ indicates a negative value, the $P_0'$ parameter of the D2D TX UE in RRC_CONNECTED mode may be set in the form of ($P_0''-Q(\bullet)$) [dBm], the $P_{MAX\_D2D}'$ parameter of the D2D TX UE in RRC_CONNECTED mode may be set in the form of ($P_{MAX\_D2D}''-Q(\bullet)$) [dBm] or the aforementioned OFFSET_1 parameter may be set to $-Q(\bullet)$.

In another example, when $f_c(\bullet)$ indicates a negative value, a in example #2-1 and/or $W_1$ and $W_2$ in example #2-2 may be set to values (e.g., negative values) independent of (e.g., different from) those when $f_c(\bullet)$ indicates a positive value, and the corresponding values may be delivered to the D2D UE through a predefined signal (e.g., SIB signal or RRC signaling) or predefined as specific values.

In addition, when $f_c(\bullet)$ indicates a negative value, $Q(f_c(\bullet))$ in example #2-2 may be defined as MIN($W_1$, MAX ($W_2$, $f_c(\bullet)$)). Here, $W_1$ may be previously signaled or set to a fixed specific value (e.g., a negative value or 0) such that the D2D TX UE in RRC_CONNECTED mode sets/applies lower transmission power than that in RRC_IDLE mode. In addition, $W_2$ denotes a minimum value of a negative power offset that can be additionally applied by the D2D TX UE in RRC_CONNECTED mode (compared to transmission power in RRC_IDLE MODE) and may be previously signaled or set to a fixed specific value (e.g., 3 [dB]).

In another example, when $f_c(\bullet)$ indicates a negative value, $Q(f_c(\bullet))$ in example #2-1 and/or #2-2 may be set to 0, which can be interpreted as an operation for preventing the D2D TX UE in RRC_CONNECTED mode from setting/applying lower transmission power than that in RRC_IDLE mode. Here, to obtain the same effect (or result), $W_1$ may be set to 0 in example #2-2 (i.e., $Q(f_c(\bullet))$=MAX ($W_1$, MIN ($W_2$, $f_c(\bullet)$))) because MIN ($W_2$, $f_c(\bullet)$) will have a negative value.

In another example, when $f_c(\bullet)$ indicates a positive value, $Q(f_c(\bullet))$ in example #2-1 and/or #2-2 may be set to 0, which can be interpreted as an operation for preventing the D2D TX UE in RRC_CONNECTED mode from setting/applying lower transmission power than that in RRC_IDLE mode. Additionally, when $f_c(\bullet)$ indicates 0, the methods used when $f_c(\bullet)$ indicates a positive value or a negative value can be equally used.

Furthermore, D2D SIG TX power of the D2D TX UE in RRC_CONNECTED mode may be set such that it is adjusted only by a function (e.g., $Q(\bullet)$) of i) a TPC value (related to PUSCH or PUCCH transmission power) or ii) a TPC value (related to PUSCH or PUCCH transmission power).

Alternatively, D2D SIG TX power of the D2D TX UE in RRC_CONNECTED mode may be set such that it is adjusted only by i) a function (e.g., $Q(\bullet)$) of i) transmission power of a PUSCH and/or power spectral density function or ii) a function of ii) transmission power of a PUCCH and/or power spectral density.

Third Scheme

According to the present invention, different timing references (referred to hereinafter as TIMING_REF) may be applied to (or used for) D2D signals. In this situation, different transmission power references (referred to hereinafter as POWER-REF) may be used (or assumed) for D2D signals to which different TIMING_REFs are applied.

Here, D2D SA (Scheduling Assignment) transmission and type-1 D2D discovery transmission may be performed according to DL timing with respect to a D2D UE and mode-1 D2D communication transmission may be performed according to UL timing with respect to the D2D UE.

Specific embodiments of the present invention are described as examples #3-1 and #3-2. Here, POWER_REF refers to a WAN UL power value that is virtually referred to or presumed as a reference value by a D2D UE in order to calculate final D2D SIG TX power although WAN UL signal transmission is not actually performed at a time SF#i at which D2D signals are transmitted from the viewpoint of the D2D UE. In other words, POWER_REF may be interpreted as a power reference hypothesis. The D2D UE may calculate/derive the final D2D SIG TX power by applying (or adding) a previously defined or signaled power offset to POWER_REF.

That is, the third scheme can be interpreted as application of a method of determining a WAN UL timing reference to D2D signal transmission and reception in consideration of the fact that D2D signals corresponding to D2D UEs may have different TIMING_REFs. Accordingly, the influence of D2D communication on WAN communication during D2D communication can be minimized according to the third scheme. More specifically, UEs close to a BS consume low power whereas UEs remotely located from the BS consume high power in WAN. Accordingly, the intensity of a signal (i.e., received power) received by the BS becomes constant and the influence on other BSs (e.g., remotely located UEs), which can be generated when UEs close to the BS consume high power, is reduced. The present invention applies the timing reference method of WAN to D2D signal transmission and reception to reduce the influence on D2D UEs which do not participate in D2D communication and maintain backward compatibility with WAN.

Example #3-1

A D2D signal conforming to DL timing may be set to use predefined PUCCH based POWER_REF. Here, it is assumed that D2D signal transmission is performed at a time SF#i, for example.

For example, PUCCH based POWER_REF can be calculated/derived as MIN $\{P_{CMAX,c}(i), P_{0\_PUCCH}+PL_c+g(i)\}$ [dBm]. This formula is identical to the formula used by a UE when a received TPC command related to a PUCCH is applied (or added) in the situation in which PUCCH transmission is not performed in a PCell. Further, the same POWER_REF may be obtained by setting some parameters (i.e., h ($n_{CQI}$, $n_{HARQ}$, $n_{SR}$), $\Delta_{F\_PUCCH}(F)$, $\Delta_{TxD}(F')$)) in the PUCCH transmission power calculation formula like the above Equation 3 to 0 [dB] according to a predefined regulation.

Refer to Equation 3 again.

$P_{PUCCH}(i)$=MIN$\{P_{CMAX,c}(i),(P_{0\_PUCCH}+PL_c+h(n_{CQI},n_{HARQ},n_{SR}),\Delta_{F\_PUCCH}(F),\Delta_{TxD}(F')+g(i))\}$ [dBm]

Here, regarding the parameter ($n_{CQI}$, $n_{HARQ}$, $n_{SR}$) as 0 [dB] may be interpreted as assuming that PUCCH format 1/1a/1b is set during calculation of POWER_REF irrespective of a configured PUCCH format used for a D2D UE for actual PUCCH transmission.

In addition, regarding the parameter $\Delta_{TxD}(F')$ as 0 [dB] may be interpreted as assuming that TXD is not set during calculation of POWER_REF irrespective of use of two ports (TXD) by the D2D UE for actual PUCCH transmission.

The parameter $\Delta_{F\_PUCCH}(F)$ may be presumed as different values (during calculation of POWER_REF) according to PUCCH formats configured for actual PUCCH transmission. For example, the parameter $\Delta_{F\_PUCCH}(F)$ may be assumed as 0 [dB] when PUCCH format 3 is set and as 1 [dB] when PUCCH format 1b (with channel selection) is set. Furthermore, the parameter $\Delta_{TxD}(F')$ may be assumed as 2

[dB] (not 0 [dB]) exceptionally or may be set to different values during calculation of POWER_REF when 2 ports are used for actual PUCCH transmission (TXD). As a specific example for the latter, the parameter $\Delta_{TxD}(F')$ may be assumed as 2 [dB] when TXD is set and as 0 [dB] when TXD is not set.

Example #3-2

A D2D signal conforming to UL timing may be set to use predefined PUSCH based POWER_REF. Here, it is assumed that D2D signal transmission is performed as a time SF#i.

For example, PUSCH based POWER_REF may be calculated/derived as MIN $\{P_{CMAX,c}(i), P_{0\_PUSCH,c}(1)+\alpha_c(1)\cdot PL_c+f_c(i)\}$ [dBm]. This formula is identical to the formula used by a UE when a received TPC command (e.g., DCI format 3/3A) related to a PUSCH is applied (or added) in the situation in which PUSCH transmission is not performed in a serving cell. The same POWER_REF may be obtained by setting the parameter $\Delta_{TF,c}(i)$ to 0 [dB], setting the parameter $M_{PUSCH,c}(i)$ to 1 and setting the parameter j to 1 in the existing PUSCH transmission power calculation formula like Equation1 according to a predefined regulation.

Refer to Equation 1 again.

$$P_{PUSCH}(i)=\text{MIN}\{P_{CMAX,c}(i),(10\cdot \log_{10}(M_{PUSCH,c}(i))+P_{0\_PUSCH,c}(j)+\alpha_c(j)\cdot PL_c+\Delta_{TF,c}(i)+f_c(i))\}[dBm]$$

Here, regarding the parameter $\Delta_{TF,c}(i)$ as 0 [dB] may be interpreted as assuming that deltaMCS is disabled (i.e., $K_s=0$) during calculation of POWER_REF irrespective of an actual value of $K_s$ set by parameter deltaMCS-Enabled. Furthermore, the parameter $M_{PUSCH,c}(i)$ may be exceptionally assumed as the number (which is not 1) of resources blocks constituting a basic resource unit of D2D signal transmission.

Fourth Scheme

The PUCCH based POWER_REF (or PUSCH based POWER_RATE) described in the third scheme may be used when POWER_REF of a D2D signal is calculated irrespective of different TIMING_REFs applied (or used) for D2D signals.

Further, the PUSCH based POWER_REF described in the third scheme may be used when POWER_REF of a D2D signal conforming to DL timing is calculated, whereas the PUCCH based POWER_REF described in the third scheme may be used when POWER_REF of a D2D signal conforming to UL timing is calculated.

Alternatively, POWER_REF may be set such that different POWER_REFs are used (or assumed) for D2D signal types (or usages). For example, D2D signals (e.g., SA and D2DSS) used to transmit relatively important information (e.g., control information) may use the PUCCH based POWER_REF, whereas D2D signals (e.g., D2D data channel) used to transmit remaining other information (e.g., data) use the PUSCH based POWER_REF.

Fifth Scheme

According to the present invention, when carrier aggregation is applied, at least part of (i.e., entire or part of) D2D signal transmission on a specific cell (or uplink component carrier) and WAN UL signal transmission on another cell (or uplink component carrier) may overlap. This phenomenon may occur when different cells belong to different TAGs (Timing Advance Groups) or DL timing is applied to (or used for) D2D signal transmission.

For example, when two cells (i.e., Cell#A and Cell#B) are used according to carrier aggregation and at least part of (i.e., entire or part of) D2D signal transmission in SF#i of Cell#A and WAN UL signal transmission in SF#i or SF#(i+1) of Cell#B overlap, PUCCH based POWER_REF (or PUSCH based PWER_REF) (according to the third scheme or the fourth scheme) in a subframe in which WAN UL signal transmission (Cell#B) is performed may be used for calculation of POWER_REF related to D2D signal transmission power setting in the overlap region.

Here, when (entire or part of) D2D signal transmission in SF#i of Cell#A and WAN UL signal transmission in SF#(i+1) of Cell#B overlap, PUCCH based POWER_REF (or PUSCH based POWER_REF) (according to the third or fourth scheme) in SF#(i+1) (Cell#A) can be used for calculation of POWER_REF related to D2D signal transmission power setting in the overlap region according to the present invention.

Otherwise, PUCCH based POWER_REF (or PUSCH based POWER_REF) (according to the third or fourth scheme) in SF#i (Cell#A) can be used when POWER_REF related to D2D signal transmission power setting in a non-overlap region is calculated.

Additionally, when two cells (i.e., Cell#A and Cell#B) are used according to carrier aggregation and at least part of (i.e., entire or part of) D2D signal transmission in SF#i of Cell#A and WAN UL signal transmission in SF#i or SF#(i+1) of Cell#B overlap, PUCCH based POWER_REF (or PUSCH based PWER_REF) (according to the third scheme or the fourth scheme) in a subframe in which WAN UL signal transmission (Cell#B) is performed may be used for calculation of POWER_REF related to total D2D signal transmission power setting. For example, when (entire or part of) D2D signal transmission in SF#i of Cell#A and WAN UL signal transmission in SF#(i+1) of Cell#B overlap, PUCCH based POWER_REF (or PUSCH based POWER_REF) (according to the third or fourth scheme) in SF#(i+1) (Cell#A) can be used to calculate POWER_REF related to total D2D signal transmission power setting according to the present invention.

Furthermore, PUCCH based POWER_REF (or PUSCH based POWER_REF) (according to the third or fourth scheme) in SF#i (Cell#A) can be used for calculation of POWER_REF related to total D2D signal transmission power setting.

Additionally, when two cells (i.e., Cell#A and Cell#B) are used according to carrier aggregation and D2D signal transmission in SF#i of Cell#A and the entire (or part of) WAN UL signal transmission in SF#i and SF#(i+1) of Cell#B overlap, a maximum value (or a minimum or mean value) of PUCCH based POWER_REF values (or PUSCH based PWER_REF values) (according to the third scheme or the fourth scheme) in SF#i and SF#(i+1) of Cell#B may be used to calculate POWER_REF related to corresponding D2D signal transmission power setting.

Furthermore, in the fifth scheme, even when at least part of D2D signal transmission in SF#i of Cell#A overlaps with WAN UL signal transmission in SF#i or SF#(i+1) of Cell#B, if a TA value difference between Cell#A and Cell#B is less than (or equal to or greater than) a predefined (or signaled) threshold, PUCCH based POWER_REF (or PUSCH based POWER_REF) (according to the third or fourth scheme) in a subframe in which (corresponding) WAN UL signal transmission (Cell#B) is performed may be used for calculation of POWER_REF related to (corresponding) D2D signal transmission power setting.

In addition, in the fifth scheme, which one of PUCCH based POWER_REF and PUSCH based POWER_REF will be used for calculation of POWER_REF related to D2D signal transmission power setting may be determined depending on TIMING_REF type applied to D2D signal transmission (as described in the third or fourth scheme).

Furthermore, in the fifth scheme, which one of PUCCH based POWER_REF and PUSCH based POWER_REF will be applied to calculation of POWER_REF related to D2D signal transmission power setting may be determined depending on D2D signal type (or usage) (as described in the fourth scheme).

The above-described schemes/embodiments/setup/regulations of the present invention may be realized as independent embodiments or a combination of at least part thereof.

Furthermore, the above-described embodiments of the present invention may be limitedly applied only when previously designated D2D communication (e.g., mode 1 D2D communication, mode 2 D2D communication, type-1 D2D discovery and type-2 D2D discovery) is performed.

In addition, the above-described embodiments of the present invention may be limitedly applied only when a TPC field (1 bit) in a D2D grant indicates OLPC (Open-Loop Power Control) (or maximum available D2D power) operation.

Further, the above-described embodiments of the present invention may be limitedly applied only when total transmission power does not exceed previously set or signaled $P_{CMAX}$(or $P_{CMAX,c}$).

Moreover, the above-described embodiments of the present invention may be limitedly applied to in-coverage D2D UEs, out-coverage D2D UEs and/or partial-coverage D2D UEs.

Further, at least part of embodiments (i.e., the second to fifth schemes) of the present invention may be limitedly applied to D2D TX UEs in RRC_CONNECTED mode (and/or D2D TX UEs in RRC_IDLE mode).

Figure 10:
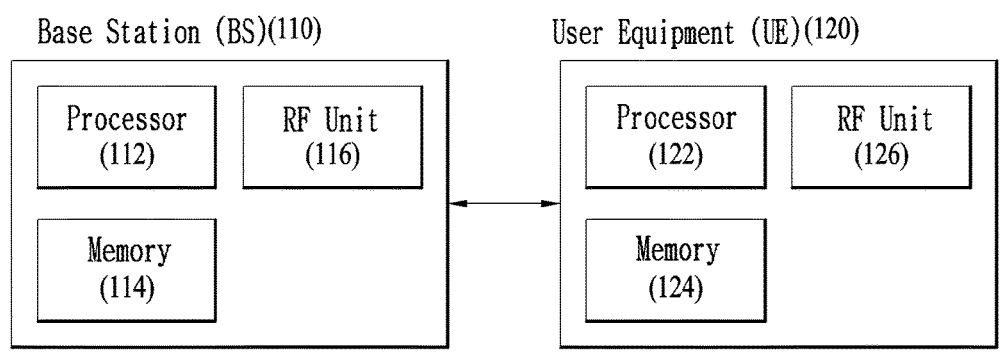
FIG. 10 illustrates a base station and a UE applicable to one embodiment of the present invention.

FIG. 10 is a diagram of a base station and a user equipment applicable to one embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 10, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this specification, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned transmission power control method for D2D communication in a wireless communication system and the device therefor have been described based on the 3GPP LTE system, the method and device may be applied to various wireless communication systems in addition to the 3GPP LTE system.

The invention claimed is:

1. A method of transmitting a device-to-device (D2D) signal and a wide area network (WAN) signal by a first D2D user equipment (UE) in a wireless communication system supporting Carrier Aggregation (CA), the method comprising:
setting a D2D transmission power reference on the basis of a first timing reference for the D2D signal and a second timing reference for the WAN signal; and
transmitting a D2D signal to a second D2D UE on the basis of D2D transmission power determined based on the D2D transmission power reference,
wherein the D2D transmission power reference is set using a WAN based physical uplink control channel (PUCCH) power reference when a first subframe depending on the first timing reference and a second subframe depending on the second timing reference overlap and the second timing reference conforms to downlink time, and
wherein the D2D transmission power reference is set using a WAN based physical uplink shared channel (PUSCH) power reference when the first subframe depending on the first timing reference and the second subframe depending on the second timing reference overlap and the second timing reference conforms to uplink timing.

2. The method according to claim 1, wherein the first timing reference is set to conform to the downlink timing when the D2D signal is a D2D scheduling assignment or type-1 D2D discovery signal, and
wherein the first timing reference is set to conform to the uplink timing when the D2D signal is a mode-1 D2D communication signal.

3. The method according to claim 1, wherein, when the second timing reference conforms to the downlink timing, the D2D transmission power reference is determined according to mathematical formula A:

$$\text{MIN}\{P_{CMAX,c}(i), P_{0\_PUCCH}+PL_c+g(i)\}, \quad \text{<Math formula A>}$$

wherein $P_{CMAX,c}(i)$ denotes a maximum transmission power of the first D2D UE, $P_{0\_PUCCH}$ denotes a parameter corresponding to the sum of cell-specific parameters, $PL_c$ indicates a downlink pathloss or signal loss estimate calculated in dB by a UE, $g(i)$ indicates a current PUCCH power control adjustment state of a subframe having an index i, and Min $\{A, B\}$ represents a function for deriving a smaller value from input parameters A and B.

4. The method according to claim 1, wherein, when the second timing reference conforms to the uplink timing, the D2D transmission power reference is determined according to mathematical formula B:

$$\text{MIN}\{P_{CMAX,c}(i), P_{0\_PUSCH,c}(1)+\alpha_c(1)\cdot PL_c+f_c(i)\}, \text{<Math formula B>}$$

wherein $P_{CMAX,c}(i)$ denotes a maximum transmission power of the first D2D UE, $P_{0\_PUSCH,c}(j)$ denotes a parameter corresponding to the sum of cell-specific nominal component $P_{O\_NOMINAL\_PUSCH,c}(j)$ provided from a higher layer and a UE-specific component $P_{O\_UE\_PUSCH,c}(j)$ provided by the higher layer, $\alpha_c(j)$ indicates a pathloss compensation factor, $f_c(i)$ indicates a current PUSCH power control adjustment state of a subframe having an index i, and Min $\{A, B\}$ represents a function for deriving a smaller value from input parameters A and B.

5. The method according to claim 1, wherein the D2D transmission power is set to be higher for a D2D UE in a radio resource control (RRC) connected state than for a D2D UE in an RRC idle state.

6. The method according to claim 1, wherein the D2D transmission power is re-set for a D2D UE in a radio resource control (RRC) connected state according to WAN based uplink communication related power control command (TPC) parameter variation.

7. A first device-to-device (D2D) user equipment (UE) for transmitting a D2D signal and a wide area network (WAN) signal in a wireless communication system supporting Carrier Aggregation (CA), the first D2D UE comprising:
a radio frequency unit; and
a processor,
wherein the processor is configured to:
set a D2D transmission power reference on the basis of a first timing reference for the D2D signal and a second timing reference for the WAN signal, and
transmit, via the radio frequency unit, a D2D signal to a second D2D UE on the basis of D2D transmission power determined based on the D2D transmission power reference,
wherein the D2D transmission power reference is set using a WAN based physical uplink control channel (PUCCH) power reference when a first subframe depending on the first timing reference and a second subframe depending on the second timing reference overlap and the second timing reference conforms to downlink timing, and
wherein the D2D transmission power reference is set using a WAN based physical uplink shared channel (PUSCH) power reference when the first subframe depending on the first timing reference and the second subframe depending on the second timing reference overlap and the second timing reference conforms to uplink timing.

* * * * *